United States Patent [19]
Andersson et al.

[11] Patent Number: 5,968,901
[45] Date of Patent: Oct. 19, 1999

[54] ANTIBACTERIAL COMPOSITION

[76] Inventors: Bengt Andersson, S-431 34, Mölndal;
Gustaf Aniansson, S-211 49, Malmö;
Ragnar Lindstedt, S-223 59;
Catharina Svanborg Eden, S-233 59,
both of Lund, all of Sweden

[21] Appl. No.: 08/880,132

[22] Filed: Jun. 20, 1997

Related U.S. Application Data

[62] Continuation of application No. 08/365,182, Dec. 28, 1994, abandoned, which is a continuation of application No. 08/215,677, Mar. 21, 1994, abandoned, which is a continuation of application No. 08/078,861, Jun. 21, 1993, abandoned, which is a continuation of application No. 07/965,527, Oct. 23, 1992, abandoned, which is a continuation of application No. 07/690,998, filed as application No. PCT/SE90/00702, Oct. 30, 1990, abandoned.

[30] Foreign Application Priority Data

Oct. 30, 1989 [SE] Sweden .................................. 8903625

[51] Int. Cl.⁶ .............................. A61K 38/17; A23J 1/20
[52] U.S. Cl. .............................. 514/7; 514/888; 530/360; 530/361
[58] Field of Search .............................. 514/2, 8, 25, 53, 514/54, 12, 21, 24, 7, 888; 530/360, 361

[56] References Cited

U.S. PATENT DOCUMENTS

| | | | |
|---|---|---|---|
| 5,506,209 | 4/1996 | Mukerji et al. | 514/21 |
| 5,538,952 | 7/1996 | Mukerji et al. | 514/21 |
| 5,576,300 | 11/1996 | Mukerji et al. | 514/21 |
| 5,643,880 | 7/1997 | Mukerji et al. | 514/21 |
| 5,707,968 | 1/1998 | Mukerji et al. | 514/24 |
| 5,712,250 | 1/1998 | Mukerji et al. | 514/12 |

FOREIGN PATENT DOCUMENTS

| | | |
|---|---|---|
| 63-284133 | 11/1988 | Japan . |
| 02276542 | 11/1990 | Japan . |
| 9532728 | 12/1995 | WIPO . |
| 9604929 | 2/1996 | WIPO . |
| 9717089 | 5/1997 | WIPO . |
| 9726320 | 7/1997 | WIPO . |

OTHER PUBLICATIONS

Hakansson et al., *American Journal of Respiratory and Critical Care Medicine*, vol. 154(4 Part 2): S187–S191, 1996 Abstract only.

Aniansson et al., *Microb. Pathog.*, vol. 8(5): 315–324, 1990 Abstract only.

Bounous et al., *Med. Hypotheses*, vol. 27(2): 133–140, 1988 Abstract only.

Aniansson et al., Annual Meeting of the American Society for Microbiology, Miami Beach, Fl (U.S.A.) May 8–13, 1988, Abstract only.

Andersson et al., *J. Infect. Dis.*, vol. 153(2): 232–237, 1986 Abstract only.

Mitsubishi, Chem Abst. 96: 8094w, 1982.

Migliore–Samour, D. Chem. Abst 111: 132354g 1989.

*Primary Examiner*—Howard C. Lee
*Attorney, Agent, or Firm*—Burns, Doane, Swecker & Mathis, L.L.P.

[57] ABSTRACT

The present invention relates to a use of casein derived from milks, preferably human milk, and porcine milk, for the preparation of a substrate for the prophylactic and/or therapeutic treatment of infections of the respiratory tract caused by *S. pneumoniae* and/or *H. influenzae*, as well as the diagnostic use of such compositions for diagnosing infections caused by said bacteria.

15 Claims, 3 Drawing Sheets

ANTIBACTERIAL COMPOSITION

This application is a continuation of Ser. No. 08/365,182, filed on Dec. 1, 1994, now abandoned, which is a continuation of Ser. No. 08/215,677, filed on Mar. 21, 1994, now abandoned, which is a continuation of Ser. No. 08/078,861, filed on Jun. 21, 1993, now abandoned, which is a continuation of Ser. No. 07/965,527, filed on Oct. 23, 1992, now abandoned, which is a continuation of Ser. No 07/690,998, filed on Jun. 18, 1991, now abandoned, which is a 371 of PCT/SE 90/00702 filed on Oct. 30, 1990.

The present invention relates to novel antibacterial compositions, in the form of pharmaceutical compositions, human food compositions, and animal feedstuffs to be used in the therapeutic and/or prophylactic treatment of infections caused by *Streptococcus pneumoniae* and/or *Haemophilus influenzae*, as well as a method for diagnosing infections caused by said bacteria.

The object of the present invention is to obtain compositions for prophylactic and/or therapeutic treatment of infections caused by *Streptococcus pneumoniae* and *Haemophilus influenzae* in the upper airways, ear-nose-and-throat infections, and also in the lower airways, e.g., the lungs by preventing adhesion of these bacteria, and/or killing the same. A further object is to be able to diagnose infections caused by these bacteria.

BACKGROUND OF THE INVENTION

Glycoconjugates interact specifically with microbial lectins, e.g. viral envelope proteins, bacterial adhesins and toxins (20). The specificity is provided by saccharide sequences, e.g. the GM1 ganglioside recognized by cholera toxin (9, 10) Gal 1→4Gal by uropathogenic *E. coli* (14, 16), or GlcNAc 1→3Gal by *Streptococcus pneumoniae* (2). When membrane bound, the glycoconjugates act as receptors, and the interaction with e.g. bacteria results in the attachment thereof to the receptor-bearing cell (17). When secreted these oligosaccharide sequences have other functions. For example, the presence in external secretions of oligosaccharide sequences corresponding to the cell-bound receptors provides the basis for competitive inhibition of microbial binding (3). Since attachment to epithelial cells is an important event in the pathogenesis of many bacterial infections, inhibition of attachment by secreted oligosaccharides may protect against infection (EP-A1-0 126 043).

Human milk is a rich source of free oligosaccharides and glycoconjugates (12, 13). Human milk inhibits the attachment both of *S. pneumoniae* and *H. influenzae* to nasopharyngeal epithelial cells in vitro (3). Inhibitors for pneumococcal binding were identified in the free oligosaccharide fraction, as expected from its content of lacto and neolactotetraose with known receptor activity for pneumococci (3).

Additional components of a molecular weight of >5000 daltons but not of immunoglobulin nature were also found to interact with both *S. pneumoniae* and *H. influenzae* (3). The present invention describes the identification of these non-immunoglobulin components in the high molecular weight fraction of human milk as caseins.

SUMMARY OF THE INVENTION

The present invention relates to the identification of non-immunoglobulin components in the high molecular weight fraction of human milk and bovine colostrum which inhibit the attachment or adhesion of *S. pneumoniae* and *H. influenzae* to cells and tissues. This fraction may be used in methods of treating or preventing infections by these organisms in mammals in need of such treatment or prevention.

DESCRIPTION OF THE PRESENT INVENTION

Figure 1:
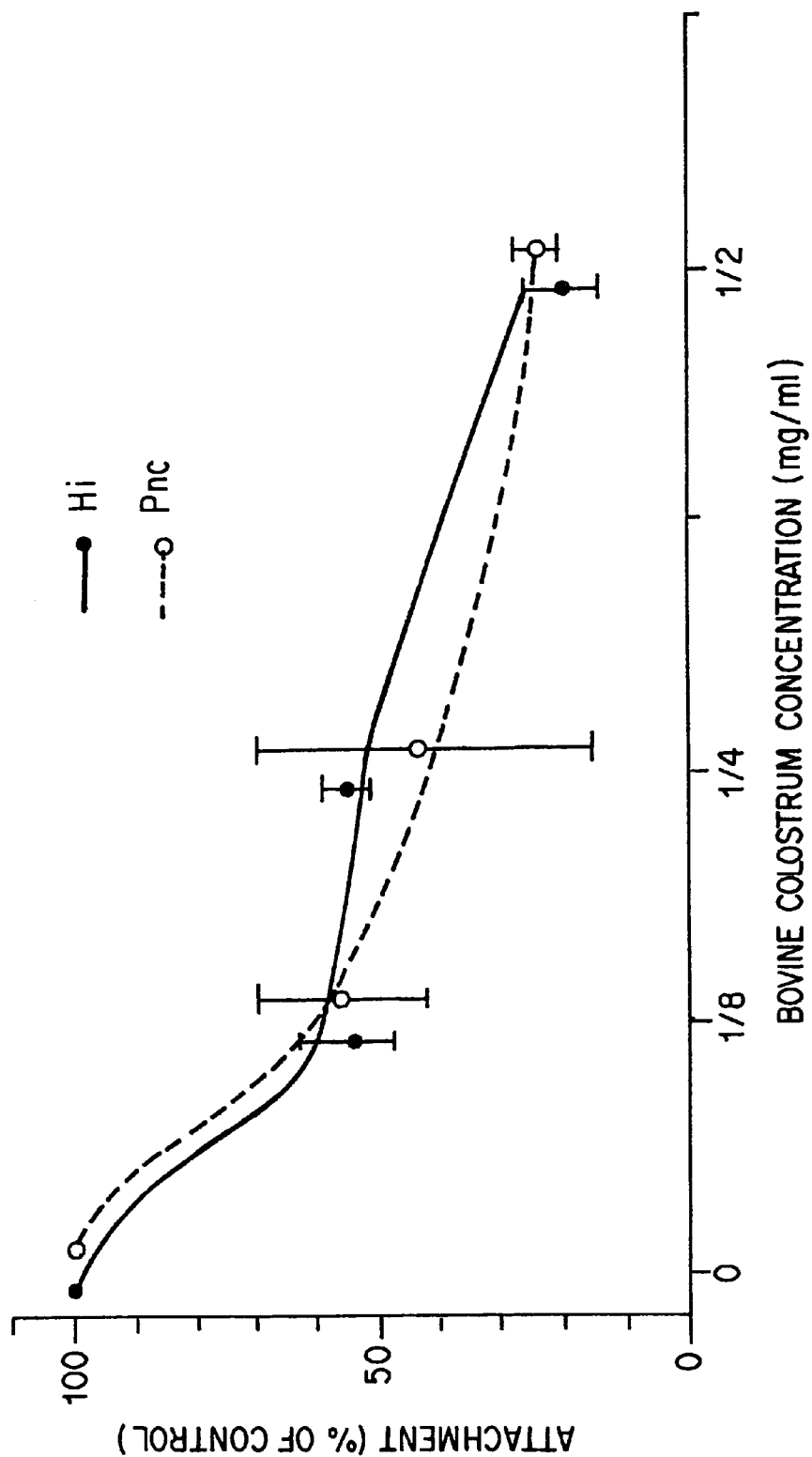
FIG. 1. Graph depicting the inhibition of attachment of *H. influenzae* ("Hi") and *S. pneumoniae* pneumococci ("Pnc") by different concentrations of bovine colostrum.

It has now surprisingly been found possible to improve the antibacterial effect against infections caused by *S. pneumoniae*, and/or *H. influenzae* by administering, prophylactically or therapeutically, a composition comprising a casein as well as commonly known inert acceptable fillers and expedients or nutrients.

Further characteristics of the invention will be evident from the accompanying claims.

The present invention will be described in detail with reference to the example given below.

The term "milk" used herein refers to either mature or colostrum milk, unless otherwise stated. The milks used may be of human, porcine, bovine, buffalo, sheep, goat, camel or kangaroo origin.

Experimental

Bacterial

*S. pneumoniae* (CCUG3114) and *H. influenzae* (Hi198) were used throughout the experiments. These strains were initially isolated from the nasopharynx of children with frequent episodes of acute otitis media. CCUG3114 (capsular type 6A) was used previously as a model strain in the studies defining the oligosaccharide binding and receptor specificity of pneumococci (2). The strains were kept lyophilized. The lyophils were transferred to blood agar (CCUG3114) or Levinthal medium agar plates (Hi198) (18). CCUG3114 was cultured for 10 hours at 37° C. in liquid medium (15), harvested by centrifugation at 1500 g for 15 minutes and suspended in 1 ml of 0.85% NaCl with 1% choline. *H. influenzae* Hi198 was cultured for 4 hours in haemophilus medium (5), harvested by centrifugation and suspended in phosphate-buffer saline (PBS).

Milk

A pool of human milk from healthy donor mothers was used when outdated for nutritional purposes. Porcine milk was obtained from a farm with healthy animals, and was milked by hand from the sows. Bovine colostrum and mature bovine milk was provided by a dairy. The mature milks were centrifuged at 2500× g for 15 minutes, and the fat was removed.

Adhesion Inhibition

Adhesion was tested as previously described (1,22). In brief, epithelial cells from the oropharynx of healthy donors ($10^5$/ml) were mixed with the bacterial suspensions ($10^9$/ml). After centrifugation at 400× g and incubation of bacteria and epithelial cells, unbound bacteria were eliminated by repeated cycles of centrifugation at 100× g and resuspension in NaCl with 1% choline.

The inhibitory activity of milk and milk components was tested following preincubation of bacteria for 30 minutes at 37° C. Epithelial cells were subsequently added and adherence testing was carried out as described. The number of bacteria attached to the epithelial cells was counted by interference contrast microscopy (Ortolux II microscope with interference contrast equipment TE Leitz, Wetzlar, FRG). Adherence was assessed by measuring the mean number of bacteria/cell in 40 epithelial cells. Inhibition was calculated as a per cent of the value of the buffer used as a control. $EID_{50}$=the effective inhibitory dose required for 50% inhibition of attachment.

Statistical Analysis

The differences in adherence between the saline control and the milk samples were evaluated using the chi-square test for the medium. The inhibitory effect of the milk components was defined by means of duplicate experiments.

The attachment to human nasopharyngeal epithelial cells of *S. pneumoniae* and *H. influenzae* was inhibited by mature human but not by mature bovine milk (Table 1). In contrast to mature bovine milk, bovine colostrum also inhibited the attachment of both species (FIG. 1).

TABLE 1

Adhesion inhibition by human and bovine milk

| | Adhesion Bacteria/cell (% of saline control) | | | | | |
|---|---|---|---|---|---|---|
| | Pneumococci | | | *H. influenzae* | | |
| Inhibitor | Mean | % | p< | Mean | % | p< |
| Saline control | 51 | 100 | | 98 | 100 | |
| Mature milk, bovine | 55 | 108 | ns | 86 | 88 | ns |
| Mature milk, human | 4 | 8 | 0.001 | 29 | 30 | 0.001 |
| HMWF, human | 6 | 12 | 0.001 | 42 | 43 | 0.01 |
| LMWF, human | 31 | 61 | 0.01 | 92 | 94 | ns |

Mean values based upon two experiments. p = compared to the saline control.

The nature of the inhibitory components in human milk was first analysed by separation according to molecular weight. The whole milk and the whey fractions were separated into fractions comprising high and low molecular weight components by passage over a G-25 Sephadex® column (cut-off 5000 dalton molecular weight, PD10, Pharmacia AB, Uppsala, Sweden). The high molecular weight fraction (HMWF) (in 3.5 ml distilled water) was treated directly. As expected from previous studies inhibitory activity for *S. pneumoniae* was found in the fraction <5000 dalton containing free oligosaccharides. The LMWF did not however influence the attachment of *H. influenzae* (Table 1).

Casein

Casein was isolated by the method of, e.g., Mellander (19). To 0.5 l of fat-free human milk, 13.5 ml of 10% potassium oxalate was added. After overnight incubation at +4° C. the precipitate was removed by centrifugation at 2500× g for 15 minutes. Distilled water was added and 0.5 mmol HCl was slowly stirred into the suspension to a final pH of 4.6. The solution was heated to 30° C. for 1 hour and subsequently left overnight at +4° C. After centrifugation (2500× g for 15 minutes), the supernatant was discarded and the precipitate was washed by 3–5 cycles of resuspension in distilled water and centrifugation. The preparation was used fresh or kept lyophilized.

The milk was further separated into the casein and whey fractions. At a concentration corresponding to that in milk (2 mg/ml) the casein fraction (HMWF) inhibited the attachment both of *S. pneumoniae* and *H. influenzae* (Table 2).

TABLE 2

Adhesion inhibition by the casein fraction of human milk.

| | Adhesion Bacteria/cell (% of saline control) | | | | | |
|---|---|---|---|---|---|---|
| | Pneumococci | | | *H. influenzae* | | |
| Inhibitor | Mean | % | p< | Mean | % | p< |
| Saline control | 106 | 100 | | 110 | 100 | |
| Human milk | 4 | 4 | 0.001 | 35 | 38 | 0.001 |
| Whey fraction | 44 | 44 | 0.01 | 101 | 92 | ns |
| Casein fraction | 13 | 12 | 0.001 | 31 | 28 | 0.001 |
| Bovine milk | 100 | 91 | ns | 100 | 91 | ns |
| Whey fraction | 115 | 108 | ns | 120 | 109 | ns |
| Casein fraction | 131 | 124 | ns | 90 | 85 | ns |

Mean values based upon two experiments. p = compared to the saline control.

Figure 2:
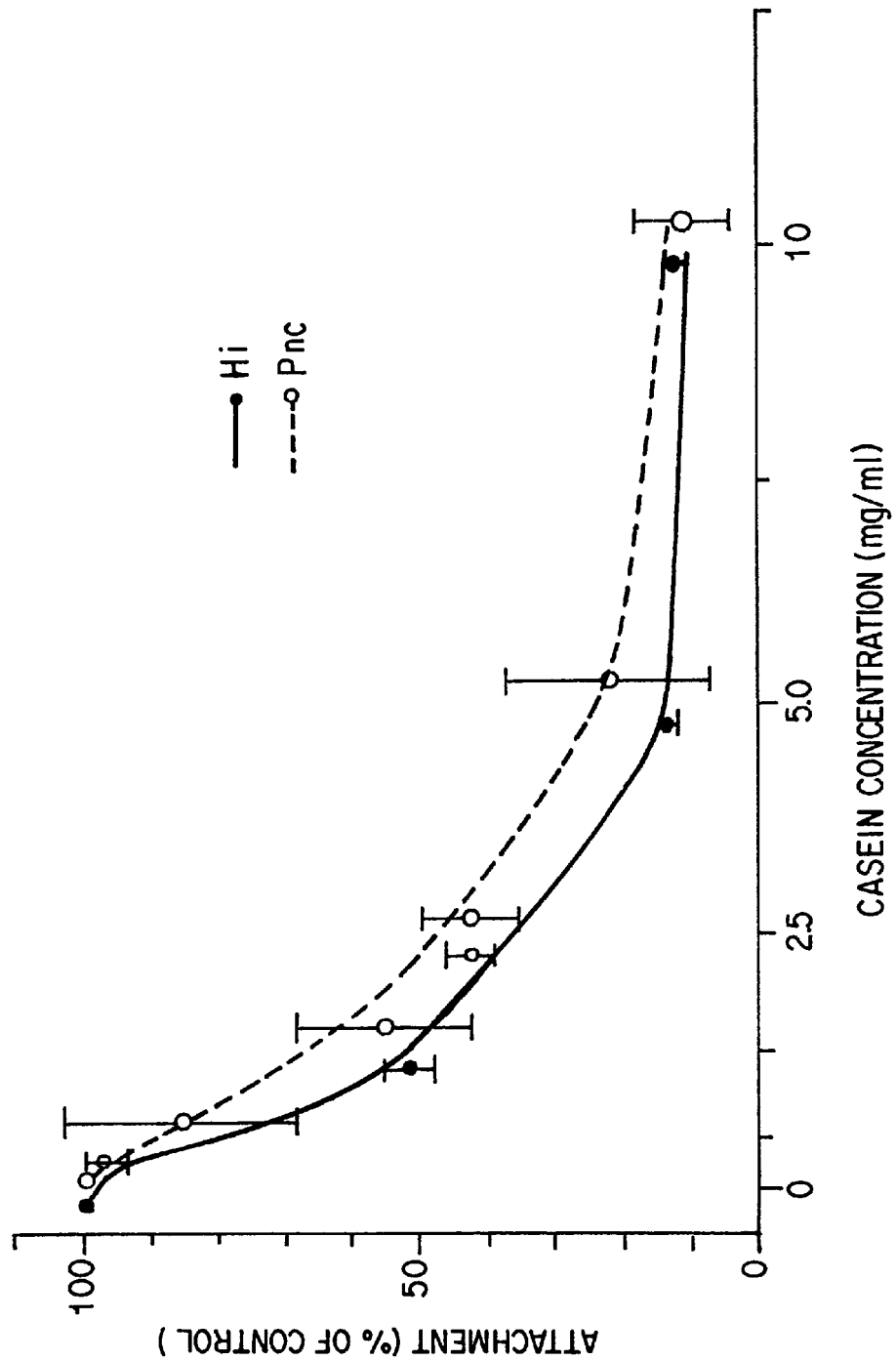
FIG. 2. Graph depicting the relationship between casein concentration and the degree of adhesion inhibition of *H. influenzae* ("Hi") and *S. pneumoniae* pneumococci ("Pnc").

The inhibitory activity of the casein fraction was confirmed with purified, commercially available human casein. On a weight for weight basis the casein fraction and the commercial fraction were equally active. The relationship between the casein concentration and the degree of adhesion inhibition is shown in FIG. 2. At 10 mg/ml the casein fraction reduced pneumococcal attachment by more than 80%. The $EID_{50}$ was about 2 mg/ml. For *H. influenzae* a similar dose response curve was obtained with a maximal inhibition of 86% at 10 mg/ml and an $EID_{50}$ value of 2 mg/ml.

The species difference in inhibitory activity between mature human milk and bovine milk was confirmed for the casein and whey fractions of bovine milk, neither of which inhibited the attachment of *S. pneumoniae* and *H. influenzae* (Table 2).

The inhibitory activity for *H. influenzae* was restricted to the casein fraction of human milk; no activity remained in the whey fraction (Table 2). In contrast pneumococcal attachment was inhibited also by the whey fraction. The molecular size of the inhibitors of the whey fraction was analysed after separation into components above and below 5000 daltons. Both the high and the low molecular weight fractions possessed inhibitory activity (Table 3).

Purified commercial components of human milk (albumin, casein, alfa-lactalbumin, and lactoferrin), were purchased from Sigma Chemical Company, St. Louis, Mo., USA.

The commercially available whey proteins of human and bovine origin had no inhibitory activity for *S. pneumoniae* (Table 3) or *H. influenzae*.

TABLE 3

Components of whey and anti-adhesive activity for *S. pneumoniae*

| | Adhesion Bacterial/cell (% of saline control) | | |
|---|---|---|---|
| Inhibitor | Mean | % | p< |
| Fractions of human milk | | | |
| Saline control | 48 | 100 | |
| Whey, total | 15 | 31 | 0.001 |
| Whey, HMWF | 20 | 42 | 0.01 |
| Whey, LMWF | 26 | 54 | 0.01 |
| Whey, boiled | 22 | 46 | 0.01 |

TABLE 3-continued

Components of whey and anti-adhesive activity for *S. pneumoniae*

| Inhibitor | Adhesion Bacterial/cell (% of saline control) | | |
|---|---|---|---|
| | Mean | % | p< |
| Commercial whey proteins | | | |
| Saline control | 72 | 100 | |
| Human albumin | 68 | 85 | ns |
| Human alfa-lactalbumin | 95 | 132 | ns |
| Human lactoferrin | 104 | 144 | ns |
| Bovine alfa-lactalbumin | 131 | 185 | ns |
| Bovine lactoferrin | 59 | 82 | ns |

Mean values based upon two experiments. p represents a comparison with a saline control. The concentration of whey components was ½ that in milk. The concentration of commercial whey proteins was 20 mg/ml.

A fraction rich in kappa-casein glycopeptide was obtained by the method of Jollés et al as follows: chymosin (Sigma; enzyme: substrate 1:2000) was added to a 2% solution of whole casein in a 0.2 M pyridine: acetic acid buffer at pH 5.5. After digestion for 1.5 hours at 37° C., trichloroacetic acid (final concentration 12%) was added and gently mixed for 16 hours at +4° C. The supernatant obtained after centrifugation at 14300× g for 2 hours at +4° C. contained the kappa-casein glycopeptide. The latter was washed six times using diethyl ether, dialyzed against distilled water at 4° C. and lyophilized.

Figure 3:
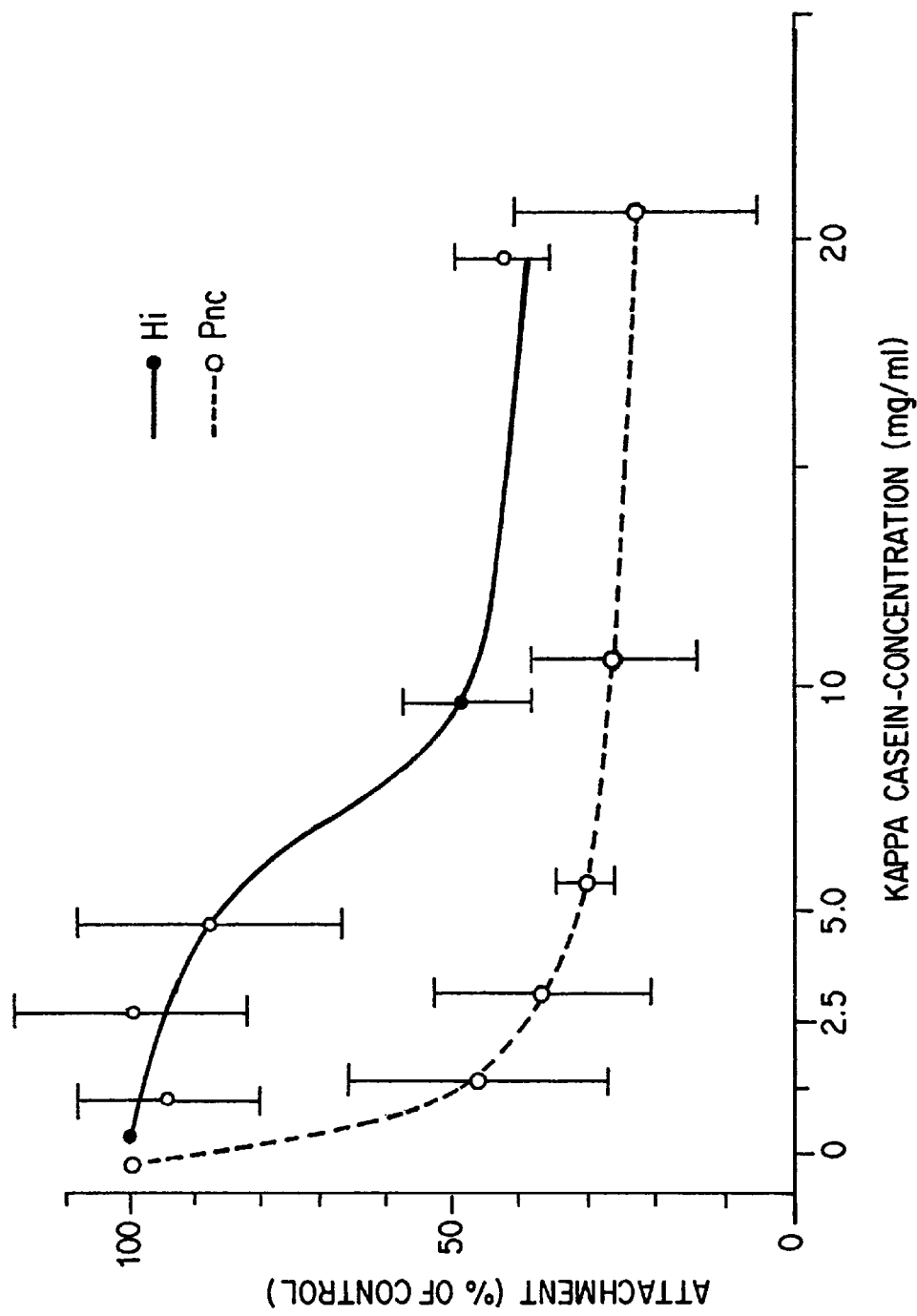
FIG. 3. Graph depicting the inhibition of attachment of *H. influenzae* ("Hi") and *S. pneumoniae* pneumococci ("Pnc") by different concentrations of kappa-casein fraction.

The casein fraction consisting mainly of kappa-casein was found to inhibit the attachment of both *S. pneumoniae* and *H. influenzae* (FIG. 3). For *S. pneumoniae* the $EID_{50}$ was about 2 mg/ml, i.e. comparable to the unseparated casein fraction. In contrast the inhibitory activity against *H. influenzae* was significantly reduced to an $EID_{50}$ of about 10 mg/ml. At a concentration of 10 mg/ml, the residual (alfa and beta casein) had no inhibitory activity.

Bactericidal Activity of Casein

The bactericidal activity of the casein was tested as follows: $1 \times 10^9$ bacteria/ml determined in a haemocytometer and casein were mixed and incubated at 37° C. for 30 minutes. After dilution to concentrations between $1 \times 10^2$ and $1 \times 10^8$ bacteria/l, the bacteria were grown on agar plates overnight. The number of bacterial colonies on the plates were counted and compared with bacteria incubated with saline buffer.

The amount of viable bacteria of *S. pneumoniae* (CCUG 3114) after treatment with the human milk casein fraction (2 mg/ml) was determined as well as the amount of viable bacteria of *H. influenzae* (Hi 198) and K88 positive *E. coli*. The results obtained are given in Table 4 below.

TABLE 4

| | | Viable counts | | | |
|---|---|---|---|---|---|
| Species | Treatment | 0' | 10' | 30' | 120' |
| *S. pneumoniae* | saline | $4.4 \times 10^8$ | $4.0 \times 10^8$ | $2.6 \times 10^8$ | $4.0 \times 10^7$ |
| | casein | $3.0 \times 10^8$ | $5.2 \times 10^8$ | $<1.0 \times 10^2$ | $<1.0 \times 10^2$ |
| *H. influenzae* | saline | $1.0 \times 10^9$ | $8.0 \times 10^8$ | $1.0 \times 10^9$ | $2.0 \times 10^8$ |
| | casein | $2.0 \times 10^8$ | $2.0 \times 10^8$ | $2.0 \times 10^8$ | $1.0 \times 10^8$ |
| *E. coli* K88 | saline | $1.0 \times 10^8$ | $3.0 \times 10^8$ | $5.4 \times 10^8$ | $7.0 \times 10^8$ |
| | casein | $5.0 \times 10^8$ | $4.0 \times 10^8$ | $1.2 \times 10^9$ | $1.0 \times 10^8$ |

As evident from Table 4 above, the number of living bacteria was considerably reduced when human milk casein was used, which indicates that human milk casein not only inhibits adhesion, but also possesses a bactericidal effect.

The adherence inhibition and the bactericidal effect were found to be independent from each other. The adhesive activity of *S. pneumoniae* and *H. influenzae* was retained after formalin fixation and casein inhibited attachment also of fixed bacteria. Test results are shown in Table 5 below.

TABLE 5

| Casein Preparation | Adhesion Bacteria/cell | | Viability Viable units | |
|---|---|---|---|---|
| | Untreated | Formalin | Untreated | Formalin |
| *S. pneumoniae* | | | | |
| saline | 30 | 27 | $1.3 \times 10^8$ | 0 |
| casein | 1 | 11 | $<1.0 \times 10^2$ | 0 |
| *H. influenzae* | | | | |
| Saline | 43 | 44 | $3.0 \times 10^9$ | 0 |
| casein | 19 | 5 | $2.0 \times 10^8$ | 0 |

The bactericidal and anti-adhesive components of casein were separated in the organic and aqueous phase. The results obtained for adhesion inhibition and viability are given in Table 6 below.

TABLE 6

| | % inhib. Bact/cell | Incub. of control | Time | Viable counts |
|---|---|---|---|---|
| S. pneumoniae | | | | |
| NaCl (control) | 51 | 100 | 30 | $1.3 \times 10^9$ |
| Casein 2 mg/ml | 18 | 35 | 30 | $1.0 \times 10^3$ |
| Casein organic phase | 5 | 9 | 30 | $4.0 \times 10^3$ |
| Casein water phase | 28 | 54 | 30 | $1.2 \times 10^9$ |
| H. influenzae | | | | |
| PBS (control) | 48 | 100 | 30 | $3.0 \times 10^9$ |
| Casein 2 mg/ml | 17 | 35 | 30 | $2.2 \times 10^9$ |
| Casein organic phase | 49 | 102 | 30 | $4.0 \times 10^9$ |
| Casein water phase | 16 | 33 | 30 | $2.4 \times 10^9$ |

In the same way as described above, porcine milk was tested for adherence inhibition. A number of healthy sows were milked by hand, the casein from each milk sample was precipitated in accordance with the method disclosed above and adherence inhibition was tested on *S. pneumoniae*. The results are given in Table 7 below.

TABLE 7

|  | % adherence |
|---|---|
| NaCl Choline | 100 |
| Human milk | 2 |
| Sow 1 | 37 |
| Sow 2 | 57 |
| Sow 3 | 60 |
| Sow 4 | 34 |
| Sow 5 | 62 |
| Sow 6 | 43 |

In a further test, the casein fraction was extracted with chloroform-methanol and the adherence inhibition was tested on S. pneumoniae and H. influenzae prior to and after extraction. As evident from the Table below, the casein fraction was not influenced by the extraction treatment. Therefor, denaturation does not influence adherence inhibition properties.

TABLE 8

|  | % inhibition | |
|---|---|---|
|  | S. pneumoniae | H. influenzae |
| Prior to extraction | 90 | 92 |
| After extraction | 100 | 86 | i.e. no change in the adherence inhibition was seen after extraction compared to before extraction.

Discussion

S. pneumoniae and H. influenzae are important causes of morbidity and mortality in all age groups. Respiratory tract infections such as meningitis, otitis, and sinusitis, are caused by bacteria which enter via the nasopharynx. Colonization at that site may thus be an important determinant of disease (1). The finding that human casein and bovine colostrum casein inhibit attachment of both species opens the possibility of preventing colonization by specific interference with attachment using these structures. The further finding that the casein fraction possesses a bactericidal effect against at least S. pneumoniae, in addition to the adhesion inhibiting effect, gives a further dimension to this invention.

As evident from the data shown, the casein fraction of human milk inhibits the attachment of S. pneumoniae and H. influenzae to human respiratory tract epithelial cells in vitro. Thus it has been demonstrated that the casein fraction inhibits adhesion. It is possible that the effect is produced by active epitopes of the casein.

The ability of human milk to inhibit attachment has been shown in several systems. Milk contains antibodies to bacterial adhesins, e.g., fimbriae (3, 23). The non-immunoglobulin fraction inhibits the haemagglutination of V. cholerae and E. coli, the attachment to guinea pig intestinal tract and protects against enterotoxin-induced diarrhea in rabbits (4, 11, 21). Although this activity has been attributed to glycoproteins and free oligosaccharides, the exact structures of the responsible agents have not yet been defined. In contrast, milk oligosaccharides which inhibited pneumococcal attachment have been identified as specific free oligossaccharides of the lactoseries (3). The inhibitory activity of the milk oligosaccharides was reproduced by synthetic analogues and bacteria agglutinated latex beads covalently coupled with the synthetic oligosaccharide receptors (2, 3).

In contrast to the results with S. pneumoniae, the present casein fraction seemed to contain all the anti-adhesive activity of milk for H. influenzae. None remained in the low molecular weight fraction or in the whey fraction. Thus the oligosaccharide sequences occurring in the free form in the milk did not appear to function as receptors. Like S. pneumoniae, however, the inhibitory activity occurred in human milk and bovine colostrum but not in mature bovine milk. Further studies aimed at identifying the receptor structures for H. influenzae can be based on this species difference.

Depending on storage conditions and other factors, the casein fraction of the milk used may undergo detrimental changes with regard to inhibition of adhesion. Thus an inhibition of adhesion of 40% or more, preferably 50% or more, more preferably 65% or more compared with a saline control may be regarded as an adequate inhibition of adhesion.

Applications

The caseins of human, porcine and/or bovine origin, can be administered in the form of an oral mucosal dosage unit, an injectable composition, or a topical composition. The casein is normally administered together with commonly known fillers and/or expedients, which are pharmaceutically acceptable.

When the casein is administered in the form of a solution for topical use, the solution may contain an emulsifying agent for the casein together with a diluent which can be sprayed into the nasopharynx. Alternatively it can be inhaled in the form of a mist into the upper respiratory airways.

For oral use, the casein is normally administered together with a carrier, which may be a solid, semi-solid or liquid diluent or a capsule. These pharmaceutical preparations are a further object of the present invention. Usually the amount of active compound is between 0.1 to 99% by weight of the preparation, preferably between 0.5 to 20% by weight in preparations for injection and between 2 and 50% by weight in preparations for oral administration.

In pharmaceutical preparations containing a casein of the present invention in the form of dosage units for oral administration, the compound may be mixed with a solid, pulverulent carrier. Examples of these carriers include lactose, saccharose, sorbitol, mannitol, starch such as potato starch or corn starch, amylopectin, cellulose derivatives or gelatin. Other components may include an antifriction agent such as magnesium stearate, calcium stearate, polyethylene glycol waxes or the like. The composition may be pressed into tablets. Multiple-unit-dosage granules can also be prepared. Tablets and granules of the above cores can be coated with concentrated solutions of sugar, etc. The cores can also be coated with polymers which change the dissolution rate in the gastrointestinal tract, such as anionic polymers having a $Pk_a$ of above 5.5. Such polymers are hydroxypropylmethyl cellulose phtalate, cellulose acetate phtalate, and polymers sold under the trade mark Eudragit S100 and L100.

Gelatin capsules can be prepared in the form of soft or hard capsules. In the former case the active compound is mixed with an oil, and in the latter case, multiple-unit-dosage granules can be contained therein.

Liquid preparations for oral administration can be present in the form of syrups or suspensions, e.g., solutions containing from about 0.2% by weight to about 20% by weight of the active compound disclosed, and glycerol and propylene glycol. If desired, such preparations can contain coloring agents, flavoring agents, saccharin, and carboxymethyl cellulose as thickening agent.

The daily dose of the active compound varies and is dependent on the type of administrative route, but as a general rule it is 1 to 100 mg/dose of active compound for oral administration, and 2 to 200 mg/dose for topical administration. The number of applications per 24 hours depends on the administration route, but may vary. For example, in the case of a topical application in the nose, from 3 to 8 times per 24 hours may be required depending on the flow of phlegm produced by the body being treated. For prophylactic use, the number of administrations may be on the lower side of the range given above.

Topical forms can preferably be used in prophylactic treatment, for example in connection with an infection caused by a rhinitis virus.

The casein can also be used as an additive in infant food, particularly for prophylactic purposes, in order to easily supply the casein to the child. Infants normally reject pharmaceuticals. The food product can thus be in the form of a pulverulent porridge base, gruel base, milk substitute base, or more complex food product as of the Scotch collops type, comprising vegetables and meat pieces, often in disintegrated form.

In the case of casein administration to animals, this would normally be added to the feedstuffs, which besides the caseins, contains commonly used nutrients.

In accordance with a further aspect of the invention there is provided a process for determining the presence of S. pneumococci and H. influenzae in a sample taken from the respiratory tract of an animal or human. This process is based on the technique of determining the degree of interaction between the bacteria of the sample and a composition of the present invention. Such interaction may be determined by inhibition or induction of the adherence of the bacteria to cells or other surfaces.

References

1. Andersson, B., Eriksson, B., Falsén, E., Fogh, A., Hanson, L. Å., Nylén, O., Peterson, H., Svanborg Edén, C., Infect. Immun., 32:311–317 (1981).

2. Andersson, B., Dahmén, J., Freid, T., Leffler, H., Magnusson, G., Noori, G., Svanborg Edén, C., J. Exp. Med. 158:559–570 (1983).

3. Andersson, B., Porres, O., Hanson, L. Å., Lagergård, T., Svanborg Edén, C., J. Infect. Dis. 153:232–237 (1986).

4. Ashkenazi, S., Mirelman, D., Pedriatric Research, 22:130–134 (1987).

5. Branefors-Helander, P., Acta Pathologica, Microbiologica et Immunologica Scandinavia (B), 80:211–220 (1972).

6. Fiat, A.-M., Jollés, J., Aubert, J.-P., Loucheux-Lefebvre, M.-H., Jollés, P., Eur. J. Biochim. 111:333–339 (1980).

7. Van Halbeck, H., Dorland, L., Vliegenhart, J. F. G., Fiat, A.-M., Jollés, P., Biochimica et Biophysica Acta. 623:295–300 (1980).

8. Van Halbeck, H., Vliegenhart, J. F. G., Fiat, A.-M., Jollés, P., FEBS 187:81–88 (1985).

9. Van Heyningen, W. E., Carpenter, C. C. J., Pierce, N. F., Greenough, W. B., J. Infect. Dis. 124:415–418 (1971).

10. Van Heyningen, W. E., Nature, 249:415–417 (1974).

11. Holmgren, J., Svennerholm, A. -M., Lindband, M., Infect. Immun. 39:147–154 (1983).

12. Jenness, R., Seminars in Perinatology, 3:225–229 (1979).

13. Kobata, A., In: Horowitz M I and Pigman W (eds), The Glycoconjugates, Academic Press, New York, pp. 423–440 (1977).

14. Källenius, G., Möllby, R., Svensson, S. B., et al, FEMS Microbiological Letter, 7:297–302 (1980).

15. Lacks, S., Hotchkiss, R. D., Biochim. Biophys. Acta, 38:508–517 (1960).

16. Leffler, H., Svanborg Edén, C., FEMS Microbiol. Letter 8:127–134 (1981).

17. Leffler, H., Svanborg Edén, C., In: Mirelman D (ed): Microbial Lectins, New York, John Wiley and Sons, pp. 84–96, (1986).

18. Levinthal, W., Zeitschift für hygiene und Infektionskrankheiten, 76:1–24 (1918).

19. Mellander. L., Upsala Läkarefören. Förhandl. N. F. Bd LII, Häft. 3–4, (1947).

20. Mirelman Ed. L., John Wiley and Sons, Microbial Lectins and Agglutinins; properties and biological activities (1986).

21. Otnaess, A. B., Svennerholm, A.-M., Infect. Immun. 35:738–740 (1982).

22. Porras, O., Svanborg Edén, C., Lagergård, T., Hanson, L. Å., Eur. J. Clin. Microbiol. 4:310–315 (1985).

23. Svanborg Edén, C., Carlsson, B., Hanson, L. Å., Jann, B., Jann, K., Korhonen, T., Wadström, T., Lancet ii:1245 (1979).

We claim:

1. A pharmaceutical composition for the treatment of infections caused by S. pneumoniae or H. influenzae, said composition consisting essentially of an effective amount of a kappa-casein fraction derived from human milk having a molecular weight of at least 5000 daltons to treat infections caused by S. pneumoniae or H. influenzae and a pharmaceutically acceptable carrier therefor.

2. The pharmaceutical composition as claimed in claim 1 which is used to treat an infection caused by S. pneumoniae.

3. The pharmaceutical composition as claimed in claim 1 which is used to treat an infection caused by H. influenzae.

4. The pharmaceutical composition as claimed in claim 1 which is in the form of an oral mucosal dosage unit.

5. The pharmaceutical composition as claimed in claim 1 which is in the form of an ingestible composition.

6. The pharmaceutical composition as claimed in claim 1 which is in the form of a topical composition.

7. The pharmaceutical composition as claimed in claim 4 wherein said kappa-casein fraction is present in the oral composition in the amount of 1 to 100 mg/dose.

8. The pharmaceutical composition as claimed in claim 5 wherein said kappa-casein fraction is present in the oral composition in the amount of 1 to 100 mg/dose.

9. The pharmaceutical topical composition as claimed in claim 6 wherein said kappa-casein fraction is present in the composition in the amount of 2 to 200 mg/dose.

10. A method for the treatment of infections caused by S. pneumoniae or H. influenzae, said method comprising administering an effective amount of a pharmaceutical composition consisting essentially of an effective amount of a kappa-casein fraction derived from human milk having a molecular weight of at least 5000 daltons to treat infections caused by S. pneumoniae or H. influenzae to a mammal in need of such treatment.

11. The method as claimed in claim 10 wherein said pharmaceutical composition is used to treat an infection caused by S. pneumoniae.

12. The method as claimed in claim 10 wherein said pharmaceutical composition is used to treat an infection caused by H. influenzae.

13. The method as claimed in claim 10 wherein said pharmaceutical composition is administered in an oral mucosal dosage unit.

14. The method as claimed in claim 10 wherein said pharmaceutical composition is administered in the form of an ingestible composition.

15. The method as claimed in claim 10 wherein said pharmaceutical composition is administered in the form of a topical composition.

* * * * *